Oct. 2, 1951 — W. E. SKIDMORE ET AL — 2,569,542
ACTUATING SCREWS
Filed Dec. 6, 1946 — 2 Sheets-Sheet 1

INVENTORS.
WALLACE E. SKIDMORE
ROBERT P. PERSON
FRANK TERDINA
BY Reynolds & Beach
ATTORNEYS Oct. 2, 1951    W. E. SKIDMORE ET AL    2,569,542
ACTUATING SCREWS Filed Dec. 6, 1946    2 Sheets-Sheet 2

*INVENTORS.*
WALLACE E. SKIDMORE
ROBERT P. PERSON
FRANK TERDINA.
BY Reynolds + Beach
ATTORNEYS Patented Oct. 2, 1951

2,569,542

UNITED STATES PATENT OFFICE 2,569,542

ACTUATING SCREWS

Wallace E. Skidmore, Robert P. Person, and Frank Terdina, Seattle, Wash., assignors to Boeing Airplane Company, a corporation of Delaware Application December 6, 1946, Serial No. 714,464

22 Claims. (Cl. 192—8)

The strut to which this invention relates is intended primarily for use in aircraft landing gear retracting mechanism, although it may have other applications. The strut is variable in effective length to move such gear between landing and stored positions. Depending upon the type of gear with which such variable length strut is used, the strut may be either extended or contracted to move the landing gear from operative position to stored position.

Since, as stated, the variable length strut of this invention may have different applications, neither a particular aircraft landing gear nor other structure which might incorporate the strut is disclosed. In any such installation, however, it is desirable to accomplish the length varying operation of the strut with a minimum of effort. At the same time provision should be made for preventing inadvertent change in length of the strut when it is subjected to tension or compression loads.

To obtain the advantages of ease of adjustment in strut length an antifriction screw and nut mechanism, such as, for example, that shown in the United States patent of Henry S. Hoffar, No. 2,298,011, issued October 6, 1945, may be employed. Where such operating mechanism is used, however, it is desirable to provide control mechanism for restricting the operation of the antifriction screw and nut actuator so that the strut can withstand tension and compression forces exerted lengthwise upon it when the strut is adjusted to different lengths.

An important object of the present invention, therefore, is to lock the parts of the strut which are relatively movable lengthwise so that they will not be moved relatively by forces applied to the strut at times when such movement is not desired. In particular, the strut parts will be locked against inadvertent relative movement when they are in fully extended and in fully contracted relationship.

A further object is to enable the length of strut to be altered at will merely upon the application to it of a force directed lengthwise of it. During such operation, however, the speed of the parts can be controlled to prevent excessively rapid adjustment of the strut length, and, on the other hand, if the relative movement of the strut parts effected by application of such force is slower than desired, supplemental rotative effort may be applied to the strut to expedite the operation of the antifriction screw and nut.

It is especially an object of the invention to provide control mechanism for such an antifriction strut actuator which will be absolutely dependable in operation, but at the same time is light in weight and not unnecessarily complex.

Advantages of the particular type of mechanism shown in the drawings will be pointed out in conjunction with the following detailed description of such mechanism.

Figure 1:
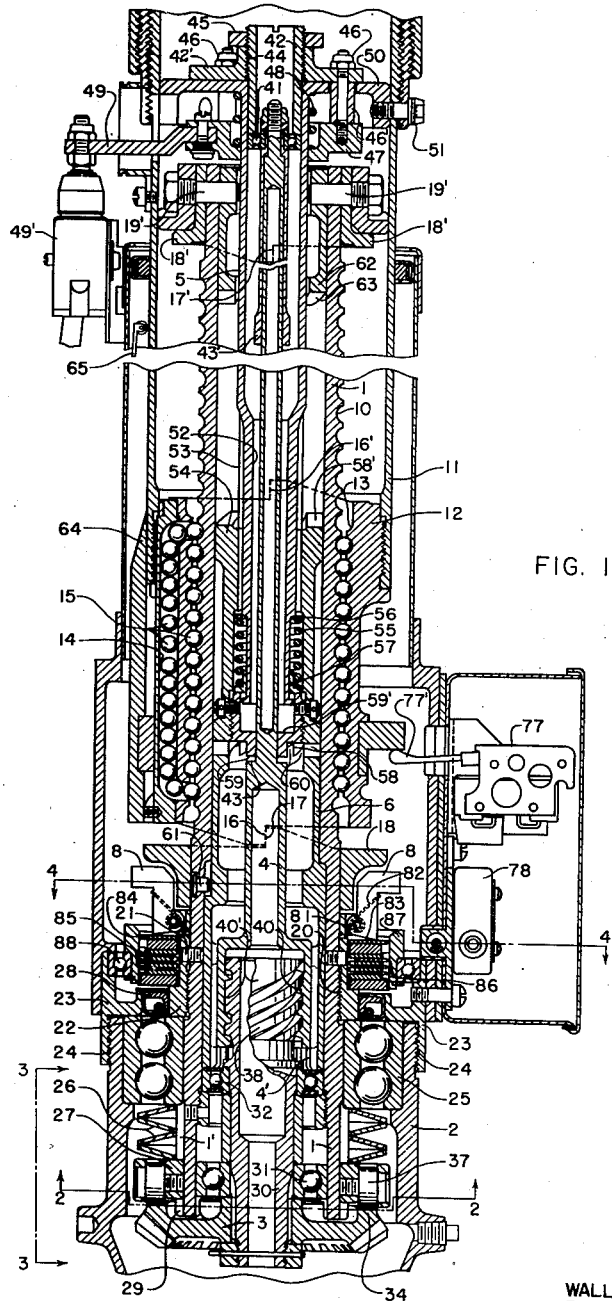
Figure 1 is a longitudinal sectional view of the strut taken substantially in an axial plane of the strut.

The major load carrying elements of the strut are two telescoping tubes, including an inner tube 1 formed externally with a helical groove 10 to constitute a screw, and an outer tube 11 which carries a nut 12. In the embodiment of the invention illustrated tube 11 and nut 12 are nonrotative and the screw tube 1 may be rotated positively by suitable drive mechanism at one end of it. The nut 12 is carried by the end of tube 11 adjacent to the screw rotating drive mechanism. This nut has an internal helical groove 13 complemental to the groove 10 of tube 1, and a by-pass passage 14 extending lengthwise of the nut and communicating with portions of the nut groove 13 spaced longitudinally of the nut. The by-pass passage 14 and such complemental screw and nut grooves 10 and 13, respectively, receive balls 15, which are engaged partially in each of such grooves and serve to interconnect the tubular screw 1 and the nut 12. As the screw and nut rotate relative to each other these balls recirculate through the by-pass passage 14.

Preferably the balls 15 of the circuit incorporate alternate large and small balls, as disclosed in the aforesaid Hoffar Patent No. 2,298,011, to reduce the friction of the screw and nut combination. Particularly where such antifriction screw and nut mechanism is employed, the control mechanism of this invention is useful. Although in a strut such as shown in the drawings either the screw or the nut may be nonrotative, in the particular device disclosed, as stated above, the tube 11 is mounted so that it cannot rotate, and during relative lengthwise movement of the tubes 1 and 11 the inner tube 1 rotates. The mounting for this tube, however, in the form of a stub tube 2, does not rotate.

The hollow screw 1 is positively secured by thread 20 and set screws 21 to a circular collar 22. Concentric with this collar is a sleeve 23 secured by thread 24 to the stub tube 2. The outer race of a combined radial and thrust bearing 25 is clamped endwise between such sleeve and an inwardly projecting rib or shoulder on such stub tube by taking up the screw connection between these parts. The inner race of this bearing is clamped between the collar 22 and shoulders on splines 1' formed on shaft 1 to define intervening grooves. The inner bearing race thus forms a reaction element for plate spring rings or washers 26 bearing against a collar 27. This latter collar is slidably mounted on the end of tube 1, inwardly projecting ribs 27' on the collar engaging the grooves between splines 1' extending lengthwise of the tube, to prevent relative rotation of these parts. Bearing 25 thus supports one end of screw 1 for rotation relative to the stub tube 2 and sleeve 23. An oil seal ring 28, interposed between such sleeve and collar 22, retains lubricant within the stub tube for the bearing.

Drive mechanism for rotating the screw 1 in order to alter the length of the strut may be either hand or power operated. When the control mechanism of this invention is used, however, the drive is not connected directly to the screw, but a bevel pinion (not shown) driven by a crank or a motor may rotate the bevel gear 3 carried by a shaft 30 which is received concentrically within the end of screw tube 1. This shaft is, to a degree, rotatively isolated from the screw tube by interengagement between them of two radial bearings 31 and 32, preferably of the antifriction type, which are spaced lengthwise of the screw and shaft. Rotation of shaft 30 and screw tube 1 are not wholly unrelated, however, but are independent only for a fraction of a turn, preferably a quarter turn.

Figure 2:
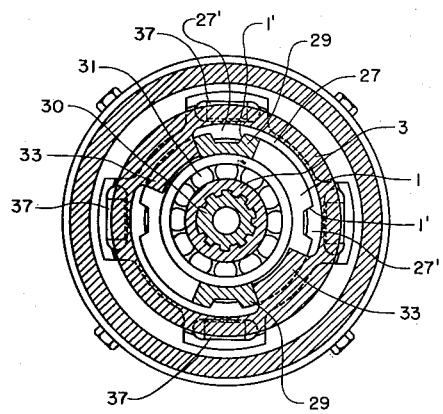
Figure 2 is a transverse sectional view through the strut taken on line 2—2 of Figure 1.

Bevel gear 3 is connected rigidly to shaft 30 in any suitable fashion, such as by the spline and nut connection shown in Figures 1 and 2. The lost or relative motion connection between this gear and screw tube 1 includes two bosses 33 on the under side of the gear projecting radially inwardly from the opposite sides of its rim, as seen in Fig. 2. These bosses are engageable with complemental projections 29 extending axially beyond opposite sides of the adjacent end of screw tube 1. The circumferential extent of projections 29 and bosses 33 is preferably the same, namely 45 degrees, so that a boss may be shifted from engagement with one projection to engagement with the other projection by rotation of gear 3 relative to tube 1 through an angle of 90 degrees.

Relative rotational movement of the gear 3 and tube 1 unlocks strut locking mechanism, described hereafter, which acts to retain the strut parts in fully extended or in fully contracted relationship. During relative rotational and lengthwise movement of the strut parts to alter the effective length of the strut it is desired that each boss 33 be held in engagement with one or the other of the projections 29, to prevent excessive play. Consequently locating mechanism for holding the bosses and projections in abutment, except during transition from contact with one projection to contact with the other, is provided, which may be actuated by the spring rings 26. These rings press collar or ring 27, slidable lengthwise of the end of tube 1 as previously described, toward the rim 34 of gear 3. Since the collar is slidably keyed or splined to the screw tube, control of the rotation of gear 3 relative to such collar will control its rotation relative to the screw.

Figure 3:
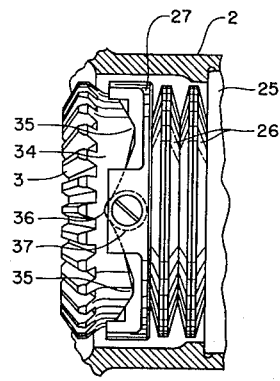
Figure 3 is a side elevational view of a portion of the strut taken on line 3—3 of Figure 1, with parts broken away.

The rim 34 projecting axially generally oppositely from the teeth of gear 3 is not planar, but is sinuous, to form a cylindrical cam having crests 35 and valleys 36 arranged alternately circumferentially of the gear rim, as shown best in Fig. 3. Adjacent crests, which are preferably rather sharp, are spaced apart an angle of 90 degrees, and each valley is located centrally between the crests on opposite sides of it. Rollers 37, mounted on ring 27 to rotate about axes disposed radially of the ring and spaced apart 90 degrees, ride on the sinuous cam edge of gear rim 34. Because of the pressure of spring rings 26 against ring 27, urging such ring toward gear 3, each roller always tends to lodge in a valley 36 of such rim, and the pressure of the rollers against the inclined cam surfaces intermediate crests 35 and valleys 36 tends to effect relative rotation in one direction or the other of the gear 3 and screw tube 1 sufficient thus to lodge the rollers. It will be evident that the rollers cannot rest in engagement with crests 35, but will ride off them in one direction or the other by effecting relative rotation of the gear and screw, and such rotation will continue until the rollers have seated in the valleys.

It is not essential that the lost motion travel between gear 3 and screw 1 be 90 degrees, or that four rollers 37, four crests 35, and four valleys 36 be provided, but the angular spacing between adjacent rollers should be a whole multiple of the lost motion travel of a boss 33 between adjacent projections 29. The valleys with which each of such rollers cooperates should be spaced apart an angle equal to such angular travel. Since, in the form of device shown, the angular travel between the gear and screw is 90 degrees, a roller 37 engaged in one valley 36 when a boss 33 is engaged with one projection 29 will be lodged in an adjacent valley when the gear and screw have rotated relatively to engage such boss with the other projection 29. Whether there are two or four rollers 37, therefore, the spring, roller, and gear rim locating mechanism will thus tend to maintain each boss 33 in contact with one or the other of projections 29, and will prevent such boss from floating in the space intermediate adjacent projections.

On opposite ends of nut 12 are formed shoulders 16 and 16', which are square on one circumferential face and inclined on the other. Preferably at least two such shoulders spaced circumferentially are provided at each end of the nut. The square faces of the shoulders on the opposite ends of the nut face in opposite directions circumferentially. The square faces of shoulders 16 are adapted to abut the oppositely facing square surfaces of cooperating shoulders 17 formed on a ring 18, which ring is secured to screw 1 by bolts 19, shown in Fig. 4, and the square faces of shoulders 16' are adapted to abut the square faces of shoulders 17' formed on a ring 18' secured to the other end of the screw 1 by bolts 19'.

The shoulders 16, 17 and 16', 17' constitute stops for terminating the relative rotational movement of the screw and nut to limit their relative lengthwise movement. Figure 1 shows shoulders 16 and 17 in abutment to stop movement of nut 12 toward the drive end of the screw, establishing the positions of the strut parts in contracted position, whereas if the screw were rotated oppositely, shoulders 16' eventually would abut shoulders 17' at the other end of screw 1, to interrupt movement of the nut along the screw in the opposite direction, and to establish the positions of the strut parts in extended position of the strut.

If only stop mechanism, such as abutting shoulders 16' and 17', were provided for stopping relative rotation of the screw and nut, movement of the nut 12 along the screw 1, by rotation of the latter to effect extension of the strut would be terminated satisfactorily at the end of the nut's travel by abutment of such shoulders, but if the driving torque by gear 34 were at that time removed and a compression load were then placed on the strut, and also the driving torque by gear 34 were at that time removed, or if any turning force were applied to the screw in a direction which would tend to contract the strut, such screw, if connected, as shown, with the nut by antifriction ball mechanism of the type described above, would immediately begin to rotate without restraint in the opposite direction, to move the nut along the screw away from collar 18' and collapse the strut. If the screw were being used in an airplane landing gear, for example, in which the strut was extended to effect retraction of the landing gear, so frictionless are the bearings between the nut and screw that in the absence of a lock holding the parts with the strut extended the weight of the gear itself might readily supply sufficient force to rotate screw 1 to collapse the strut, which would allow the gear to drop to landing position at an inconvenient time. On the other hand, when the abutment of shoulders 16 and 17 had terminated contracting movement of the strut, as with the landing gear lowered, the stress on the strut would immediately be reversed by application to the landing gear of the landing impact load. Such stress would initiate extension of the strut, causing involuntary folding or retracting movement of the landing gear, which would be extremely undesirable, of course. In addition to simple stop mechanism, such as the shoulders 16, 17 and 16', 17', for various uses of such a strut it is therefore desirable to provide positive locking means which will retain the strut in either extreme position, that is, fully extended or fully contracted. Such locking mechanism should be operated automatically, and should not entail any voluntary actuation in addition to effecting the drive of gear 3 in one direction or the other, depending upon the direction in which it is desired to move nut 12 along the screw.

In the strut shown in the drawings locking mechanism for holding the screw and nut against inadvertent relative rotation is actuated by the lost motion rotation between screw tube 1 and shaft 30 located concentrically within the end of the screw. On the end of such shaft remote from gear 3 is a high pitch thread 38, exceeding in angular extent the angular lost motion between the gear and screw, such motion in the instance selected being a quarter turn. This thread is engaged with a complemental thread 40 of a control rod 4 received centrally or coaxially within the tubular screw 1, and extending axially substantially entirely through the screw. Such thread 38 is shown as being an external thread, and the cooperating thread is an internal thread formed within the enlarged end of the rod 4. Such end and screw 1 have cooperating splines 4' interconnecting them for conjoint rotation, but guiding the control rod for movement lengthwise of the screw over a short distance.

The opposite end of control rod 4 carries a radial antifriction bearing 41 which slides snugly in the hollow of a locking sleeve mounting tube 5, which tube is located intermediate the rod and the screw 1, and concentric with both. The tube 5 is integral with cap 50 secured by bolts 51 to the outer tube 11, which outer tube carries nut 12 as previously explained. Also fitting snugly within tube 5 adjacent to bearing 41 and abutting the end of its outer race remote from the body of tube 4 is a short tube 42 integral with a plate 42', which plate normally abuts cap 50. This plate is secured, such as by threads 44 and locknut 45, to the tube 42. The purpose of this plate and tube will be described later.

The end of tube 5 remote from cap 50 extends within nut 12, and is thickened to form a reduced bore 52 within it. Splines 53 formed on the outer surface of such thickened tube end engage complemental splines on a locking sleeve 54 encircling and carried by such tube. This sleeve is therefore slidable lengthwise of its mounting tube, but is held against rotation relative to it. A compression spring 55 received within the locking sleeve and encircling tube 5 reacts between washers 56 and 57, each of which extends radially sufficient to bridge the space between such tube and sleeve 54. These washers are engageable both with shoulders formed on such tube and with shoulders on such sleeve, the shoulders on the tube being spaced apart the same distance as the shoulders on the sleeve, so that the expansive force of the spring acting on the washers 56 and 57 tends to maintain the corresponding shoulders of the tube and sleeve in registry. In whichever direction the sleeve slides along the tube, therefore, spring 55 will be further compressed by approach movement of washers 56 and 57.

On one end of locking sleeve 5 are jaws 58 projecting longitudinally beyond it, while at the opposite end are similar jaws 58' projecting in the opposite direction. The jaws of each set, arranged circumferentially around the sleeve, are beveled on one side, and have a square face on the other side. The jaws 58 and 58' of the locking sleeve are adapted to engage complemental jaws carried by the screw 1. While such latter jaws could be formed integral with the screw, it is preferred that they be formed on separate jaw tubes secured to the screw.

A jaw tube 6, which, like collar 18, is secured to the screw by bolts 19, has locking jaws 60 formed on its end adjacent to one end of screw thread 10. A registry or locating pin 61 interconnecting the locking jaw tube 6 and the screw tube insures that these tubes will be assembled to dispose jaws 60 in the proper rotative relationship. Since the tube 6 is fixedly secured to the screw it functions as an integral portion of the screw tube 1. Within the opposite end of the screw is received a second jaw tube 62, on which are formed locking jaws 63, adapted for engagement with the jaws 58' of locking sleeve 54. These are formed on tube 62 adjacent to the end of screw thread 10 remote from jaws 60. Jaw tube 62, like collar 18', is secured to the screw by bolts 19'.

Control rod 4 has only limited movement axially of screw 1, namely, that movement equal to a quarter of the pitch of the screw threads 38 and 40. Although these threads, as stated previously, are of very high pitch, they are of sufficient length so that a 90 degree relative rotation of shaft 30 and the control rod will not uncouple them. One thread 40' may be wider than the others to afford correct rotative orientation of threads 38 and 40 in assembling the mechanism. Relative rotation of shaft 30 and control rod 4 through a quarter turn will shift such rod axially of screw 1 a predetermined distance in one direction or the other, depending upon the direction of such relative rotation.

The control rod has a reduced portion intermediate its ends passing through locking sleeve 54, which portion forms a shoulder 43 near one end of the rod cooperating with the end surface 59 of the locking sleeve. The opposite end of rod 4 is enlarged, to form an oppositely facing shoulder 43', yet such end is of a size small enough to pass through the reduced bore 52 of the tube 5, so that such shoulder may abut the inner surface 59' of the locking sleeve 54. To simplify construction, such latter enlarged end may be formed separately and secured on the end of the control rod, as shown.

During contracting movement of the strut the screw 1 will be rotated by gear 3, through engagement of bosses 33 and projections 29, in a direction to move nut 12 downwardly along the screw as seen in Fig. 1. Rotation of shaft 30 relative to control rod 4 to effect abutment of bosses 33 and projections 29 to accomplish such rotation of the screw and nut will draw control rod 4, by the action of threads 38 and 40, to its extreme left position, as shown in Fig. 1. Locking sleeve 54, being held by spring 55 stationary relative to tube 5, which tube, as previously mentioned, is secured to the outer tube 11, will, like nut 12, be moving downward. As the nut reaches the lower end of the screw thread 10 the jaws 58 of locking sleeve 54 will engage the jaws 60 of jaw tube 6. The continued rotation of tube 6 and the axial approach movement of sleeve 54 will cause the jaws 60 to ratchet past jaws 58, the locking sleeve yielding axially of its mounting tube 5 against the resilience of spring 55 as necessary to permit such action, despite the continued movement of such tube toward tube 6.

Such ratcheting of jaws 60 past jaws 58 will continue, accompanied by a progressive increase in the compression of spring 55, until the square surfaces of stop shoulders 16 move into position to be struck by the square surfaces of screw shoulders 17 as the screw rotates, to terminate positively relative rotation of the screw and nut. Such increase in stress of the spring does not appreciably retard rotation of the screw as the nut approaches its limiting position because of the mass of the moving parts. When the parts have come to rest continued rotation of screw 1 relative to nut 12 in the same direction is prevented by engagement of shoulders 16 and 17. On the other hand, the screw can not rotate in the opposite direction relative to the nut because the square faces of jaws 60, rotatively fixed relative to screw 1, are in abutment with the square faces of jaws 58 on the non-rotative locking sleeve 54, secured to nut 12 through tube 5, cap 50, and tube 11. Consequently the screw and nut are locked against relative rotation in either direction, and therefore are likewise locked against relative longitudinal movement in both directions.

As the nut 12 nears the end of its contracting movement as described, the inner end of sleeve 42 will approach the bearing 41 on the end of control rod 4. To plate 42', secured to tube 42, is connected by bolts 46 a second plate 47 slidable on tube 5. These plates are held in definitely spaced, parallel relationship by spacer sleeves 46' encircling bolts 46, which sleeves are slidable freely through holes in cap 50. Normally the plates 42' and 47 are forced to the left by a spring 48 interposed between plate 47 and such cap, to press plate 42' against the cap.

An arm 49, carried by plate 47, is moved with the plate and nut assembly toward a switch 49' mounted on the stationary screw casing. Just prior to contact of stop shoulders 16 and 17 this arm will be moved into engagement with the switch element, provided that the lock control rod is in its lower position to enable the locking jaws 58 and 60 to engage. This engagement of such switch element will energize a signal indicating that the strut has been fully contracted and locked in such position.

To release the parts from their locked condition in contracted position of the strut, it is merely necessary to turn gear 3 in the opposite direction. This may be accomplished by closing a manual control switch connected in a suitable electric circuit for energizing the drive motor to turn bevel gear 3 in a direction to extend the strut. Such movement does not tend immediately to rotate screw 1, because initially the bosses 33 of this gear will be moved away from the projections 29 which they previously abutted, held stationary by the locking mechanism preventing rotation of the screw. A relative lost motion rotation between shaft 30 and screw 1 occurs, through an angle of 90 degrees in the instance described, before these bosses contact the other projections. Such lost motion rotates screw thread 38 relative to screw thread 40 to project control rod nonrotatively and axially upward relative to screw 1 and the parts locked to it. By reason of such rod movement shoulder 43 strikes the end surface 59 of locking sleeve 54 and slides it upward along tube 5, as seen in Fig. 1, further compressing spring 55. Such axial movement of the locking sleeve thus effected by the control rod is sufficient to withdraw the jaws 58 of the locking sleeve from engagement with the jaws 60 of tube 6 by the time bosses 33 on gear 3 contact the other projections 29 on screw 1, thus freeing such screw for rotation in the strut extending direction.

The upward axial movement of the control rod 4 accomplishes an operation in addition to such unlocking of jaws 58 and 60. It will be remembered that sleeve 42 was positioned substantially in abutment with control rod bearing 41 at the time stop shoulders 16 and 17 came into contact during contracting movement of the strut. When the control rod is moved lengthwise upward prior to initiation of extension movement of the strut, therefore, it will slide tube 42 upward with it and shift both plates 42' and 47 correspondingly against the resilience of spring 48, which will be compressed. The distance plate 47 is shifted will be sufficient to retract arm 49 from the switch mechanism 49' enabling its signal switch to open to indicate that the strut has been unlocked by deenergization of its signal.

As soon as the gear bosses 33 engage the screw projections 29 following reversal of the drive for gear 3, rotative effort will be exerted upon the screw, but at such time the screw will be unlocked for rotation to extend the strut by separation of jaws 58 from jaws 60 in the manner explained above. Continued rotation of the screw in such direction thereupon moves nonrotative nut 12 upward, as seen in Fig. 1, and the consequent movement of the cap 50 soon relaxes spring 48 until such cap contacts plate 42'. Thereupon both plates 43 and 47, as well as tube 42, will move upward with tubes 5 and 11. During such rotation of the screw to extend the strut, bosses 33 are held in engagement with the projections 29 which they contacted immediately following the unlocking operation whether continued rotation of the screw is effected by driving of gear 3 or by axial stress upon the strut, by engagement of rollers 37 in appropriate valleys 36 of the drive gear's sinuous rim.

As the nut and screw approach their relationship of maximum extension, jaws 58' of locking sleeve 54 will contact jaws 63 of tube 62. During continued upward movement of tube 5, as seen in Fig. 1, the locking sleeve will yield downward relative to such tube against the force of spring 55 to enable the inclined surfaces of rotating jaws 63 to ratchet past the axially approaching jaws 58' on the locking sleeve. Rotation of screw 1 may be retarded by the progressively increasing resistance created by such ratcheting action as the compression of spring 55 increases, and eventually is interrupted positively by engagement of stop shoulders 16' with shoulders 17' integral with screw 1. As the parts are thus halted, reverse rotation of the screw is prevented by engagement of the square surfaces of jaws 58' with the square surfaces of jaws 63.

It will be remembered that immediately prior to the initiation of rotation of screw 1 to drive nut 12 upward as seen in Fig. 1, control rod 4 was moved upward by rotation of shaft 30 relative to such rod through a quarter revolution, and that such movement cooperated with signal switch actuating mechanism 49, 49'. Because the control rod does not travel with the nut 12, signal switch mechanism of a different type would be required to indicate that the strut had reached its extended locked position, if desired.

Limit switches may be provided for deenergizing the electric motor driving gear 3 when the strut parts reach the limit of their extended or contracted movement. To actuate the strut extension limit switch mechanism a wedging member 64 may be mounted on tube 11 which travels with nut 12. As this tube approaches the limit of its extension movement the wedging surface of member 64 will deflect outward an arm 65 to open the switch. The switch mechanism controlled by this arm may be simply a limit switch, or a signal switch, or both. In Fig. 1 a second limit switch 77 is shown, opened by engagement with it of a member carried by the strut at the end of its contracting movement.

Initial rotation of gear 3 in the direction to contract the strut again may be effected by closing a manual switch in a suitable drive motor circuit. Bosses 33 of gear 3 will first be rotated away from the projections 29 which they engaged during extension movement of the strut, and will be moved toward the other projections. Simultaneously rotation of shaft 30 will draw control rod 4 downward relative to tube 5 and sleeve 54 sufficiently to strike the control rod shoulder 43' against the inner surface 59' of locking sleeve 54, which will slide such locking sleeve downward relative to tube 5 to withdraw jaws 58' from engagement with jaws 63 in a direction axially of the strut. By the time the lost motion movement of bosses 33 between the projections 29 has been completed, therefore, the screw and nut parts will again have been unlocked, so that continued rotation of gear 3 will rotate screw 1 positively for moving nut 12 downward along screw 1, again to contract the strut. After slight travel of tube 11 wedging member 64 will be released from switch arm 65 so that the limit switch controlled by it will close again to maintain the motor circuit closed.

Figure 5:
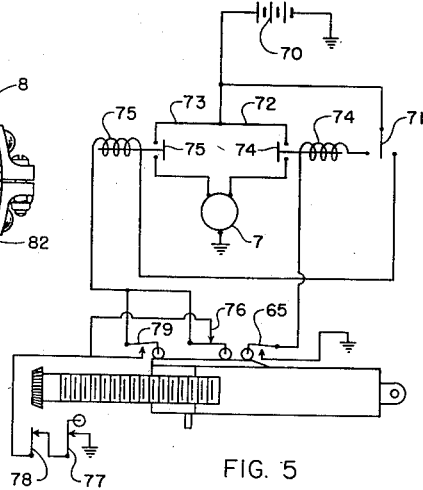
Figure 5 is a circuit diagram of electrical operating and control mechanism associated with the strut.

A suitable circuit diagram for an electric motor 7 to drive bevel gear 3, through suitable reduction gearing (not shown), is illustrated in Fig. 5. This motor is energized by a power source 70 controlled by a manual switch 71, which in this instance is a positive double throw switch swingable to the left to energize a circuit 72 to rotate the motor in the direction for extending the strut, and swingable to the right to energize a circuit 73 for reversing the direction of motor rotation to contract the strut. In addition to switch 71 the strut-extended limit switch 65 controls circuit 72, and a strut-contracted limit switch 77 controls circuit 73. These limit switches and control switch 71 could be connected directly in motor circuits 72 and 73, but it is preferred that they control relays 74 and 75, respectively, to actuate switches 74' and 75', which in turn control circuits 72 and 73, respectively.

If switch 71 is swung to the left and limit switch 65 is closed, a circuit will be completed through relay 74 to close switch 74' for energizing the motor 7 to rotate screw 1 in a direction to extend the strut. Upon completion of the extending action limit switch 65 will be opened, by wedge member 64 as described above, to deenergize relay 74 for releasing motor circuit switch 74' so that it will open and terminate the motor operation. If, now, control switch 71 is swung to the right, the strut-contracted limit switch 77 being closed (disregarding the other switches in circuit with it for the moment), relay 75 will be energized, to close switch 75' for energizing the motor to rotate in the opposite direction. When the strut has been fully contracted limit switch 77 will be opened for deenergizing the relay 75, and in turn the motor 7 by releasing switch 75' to open.

If the strut is incorporated in an aircraft landing gear, or in any other installation where an axial stress would be exerted on the strut, it may be desirable to have additional control switches in the motor circuit. Thus if, in moving from retracted position to landing position, stress is exerted by the landing gear on the strut to contract it, ordinarily it will be unnecessary for power to be applied to gear 3 of the screw to contract it after it has been unlocked, but it may be contracted by the weight of the landing gear as it moves downward. The strut lock will prevent inadvertent commencement of contraction of the strut by the force of the landing gear weight. In such an installation a cutoff switch 76 may be included in the circuit. After the motor has rotated sufficiently to unlock the strut and to start screw 1 by rotating it through perhaps half a turn, switch 76 will open to deenergize relay 75 and consequently motor 7. The purpose of deenergizing the motor is to enable a throw-out or overrunning clutch between its reduction gearing and the gear 3 to be disengaged, so that the screw mechanism of the strut may turn without retardation by the reduction gearing and motor.

If the stress exerted on the strut should diminish, or if the effort required to rotate the screw 1 should increase, it may be necessary later to exert a positive torque on the screw by the motor 7. For this purpose a switch 79 connected in parallel with switch 66 may be provided. After the strut has been contracted to a predetermined degree and subsequent to opening of switch 76, switch 79 will close. A circuit still will not be completed through the motor control relay 75 unless a further, speed-governed switch 78 in series with switches 76 and 79 is closed. This latter switch will be maintained open as long as the direct stress exerted on the strut screw, such as by the weight of the landing gear, continues to rotate the screw faster than a predetermined speed. If the speed drops below such value, this switch will close so that the motor will assist rotation of the screw. Closing of switch 78 upon a retardation of the screw rotation by ratcheting of the locking jaws near the end of the screw travel cannot maintain the motor in operation after the screw has been stopped by the stop shoulders, of course, because of the opening of limit switch 77 in series with the speed-governed switch.

Referring to the landing gear structure, the limit switch 77, as shown in Fig. 1, may have an arm 77' engaged by the nut 12 when the strut is in contracted position to maintain this switch open until the nut has traveled along the screw toward extended position for a predetermined distance. Alternatively, arm 77' might actuate one or both switches 76 and 79, as well as switch 77, to close switch 76 while the strut is contracted, and, during extension movement of the strut, operate first to open switch 76 and close switch 77, and later to close switch 79. In fact, the same arm 77', or a similar arm, may actuate a strut-contracted signal switch.

It has been mentioned previously that switch 78 is governed by the speed of screw rotation. Such switch is of the normally closed type, and is opened when the rotative speed of the screw, effected by the direct stress applied to the strut, increases above a predetermined value. The mechanism for actuating switch 78 in this manner may include flyweights 8 carried by levers 80 which are swingable about pivot pins 81 extending tangentially of the screw and securing such levers to the screw. Normally the weights 8 are urged toward the screw by coil springs 82 encircling the pivot pins, which oppose the centrifugal force acting on such weights. Levers 80 have heels 83 which engage one end ring 84 of a friction ring brake assembly. Alternate rings 85 of this assembly rotate with the screw, whereas the interposed rings 86 are carried by a mounting ring 87 supported by the inner race of an antifriction bearing 88. The outer race of this bearing is anchored to the stationary sleeve 23.

Figure 4:
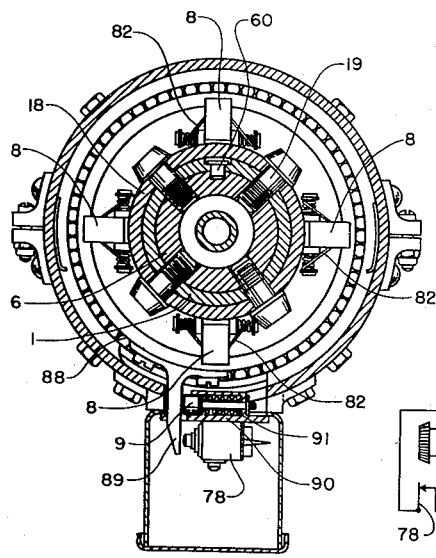
Figure 4 is a transverse sectional view through the strut taken on line 4—4 of Figure 1.

The inner race of bearing 88 cannot rotate, but can only shift circumferentially through the slight angle permitted by engagement of its arm 89 with a stop plunger 9. This plunger reciprocates in a cylinder 90 containing a spring 91 acting to press the plunger 9 against arm 89. This arm can swing to open switch 78 only after it has pressed plunger 9 to the right, as shown in Fig. 4, through a predetermined distance against the resistance of spring 91.

As the speed of rotation of screw 1 increases the flyweights 8 will, of course, move outward away from the screw, opposed by the resilience of springs 82, by the action of centrifugal force. The resultant swinging of levers 80 will press ring 84 in a direction to compress the friction brake assembly 85, 86. The torque thus applied to rings 86 of such assembly will turn the inner race of bearing 88 in a direction to press arm 89 against plunger 9. When the speed of screw rotation has increased sufficiently so that the resistance of plunger spring 91 has been overcome, arm 89 will engage switch 78 to open it, thus maintaining the drive motor 7 deenergized, as explained previously, as long as the critical rotative speed of the screw persists. Spring 91 will be selected or adjusted so that its stiffness will correspond to the rotative speed of screw 1 at which it is desired to have switch 78 open.

If the rotative speed of the screw 1 should tend to become excessive, the pressure of levers 80 on the brake assembly 85, 86 will be sufficient to cause the friction created by the brake assembly to limit the speed of screw rotation to a reasonable value, because the faster it tends to rotate the greater will be the retarding force produced by the brake. Despite engagement of arm 89 with switch 78 upon high speed rotation of the screw and the production of substantial braking force, the switch will not be injured because the coils of spring 91 may be pressed together to form a solid column resisting the force exerted by arm 89 during such application of the brake.

We claim as our invention:

1. A strut comprising cooperating antifriction screw and nut units, locking means carried antirotationally by said units and normally disengaged but interengageable between said screw and nut units in strut-contracted relationship to hold the screw and nut units against relative strut-extending movement resulting from axial strut loads, and means operable, independently of axial strut load, to release said locking means to enable strut-extending relative movement of said screw and nut units unrestrained by said locking means.

2. A strut comprising cooperating antifriction screw and nut units, locking means carried antirotationally by said units and normally disengaged but interengageable between said screw and nut units in strut-extended relationship to hold the screw and nut units against relative strut-extending movement resulting from axial strut loads, and means operable, independently of axial strut load, to release said locking means to enable strut-contracting relative movement of said screw and nut units unrestrained by said locking means.

3. A strut comprising cooperating antifriction screw and nut units, one of said units being nonrotative and movable axially of the strut, and the other of said units being rotative, said rotative unit including locking means, said nonrotative unit including locking means supported for general movement axially therewith and adapted to cooperate with said rotatable unit locking means the support for said nonrotative unit locking means permitting slight movement thereof axially relative to said nonrotative unit, said nonrotative unit locking means being engageable with said rotative unit locking means by axial movement of said non-rotative unit, and means operable to shift said nonrotative unit locking means a short distance axially relative to said nonrotative unit in the direction opposite engaging movement of said nonrotative unit locking means, and thereby releasing said nonrotative unit locking means from said rotative unit locking means.

4. A strut comprising cooperating antifriction screw and nut units, one of said units being nonrotative and movable axially of the strut, and the other of said units being rotative, said rotative unit including two locking means spaced apart a substantial distance axially thereof, said nonrotative unit including locking means supported for general movement axially therewith and adapted to cooperate with each of said rotative unit locking means, the support for said nonrotative unit locking means permitting slight movement thereof axially relative to said nonrotative unit, said nonrotative unit locking means being engageable with said respective rotative unit locking means by axial movement of said nonrotative unit in opposite directions relative to said rotative unit, and means operable to shift said nonrotative unit locking means relative to said nonrotative unit in the direction opposite engaging movement of said nonrotative unit locking means, and thereby releasing said nonrotative unit locking means from said rotative unit locking means.

5. A strut comprising an antifriction assembly including a screw member and a cooperating nut member, means supporting one of said members for rotation, means supporting the other of said members nonrotatively for axial movement relative to said rotative member by rotation thereof, drive means operable to rotate said rotative member, locking means carried by said nonrotative member and operable by relative movement of said screw and nut members in one direction to hold the screw and nut members against relative movement in the opposite direction caused by axial strut loads, lost motion means interposed between said drive means and said rotative member and operable to transmit driving force from said drive means to said rotative member after initial movement of said drive means, and threaded lock-releasing means interengaged between said drive means and said locking means, and rotatable by said lock-releasing means while said lost motion means are ineffective to transmit motion from said drive means to said rotative member, to shift said locking means axially relative to said nonrotative member to release said locking means for rotation of said rotative member in said opposite direction.

6. A strut comprising tubular screw and nut members, means supporting said screw member for rotation, means supporting said nut member nonrotatively for axial movement relative to said screw member by rotation thereof, drive means operable to rotate said screw member, a locking member received within and carried by said nut member, also nonrotative, and having locking jaws at one end thereof, a locking member received within and carried by said screw member, rotatable therewith, and having locking jaws complemental to the locking jaws of said first locking member, the jaws of said two locking members being engageable by relative axial and rotative movement of said screw and nut members in one direction and being operable by such engagement to hold the screw and nut members against relative movement in the opposite direction caused by axial strut loads, drive means operable to rotate said screw member, lost motion means interposed operatively between said drive means and screw member, and lock-releasing means operable by initial rotation of said drive means to shift said nut-carried locking member axially away from said screw-carried locking member to enable relative movement of said screw and nut members in such opposite direction.

7. A strut comprising tubular screw and nut members, means supporting said screw member for rotation, means supporting said nut member nonrotatively for axial movement relative to said screw member by rotation thereof, drive means operable to rotate said screw member, a locking member received within and carried by said nut member, also nonrotative, and having locking jaws at both ends thereof, two locking members received within and carried by said screw member in spaced relationship, rotatable therewith, and having locking jaws complemental to the locking jaws of said first locking member, the cooperating jaws of said locking members being engageable by relative axial and rotative movement of said screw and nut members in one direction and being operable by such engagement to hold the screw and nut members against relative movement in the opposite direction caused by axial strut load, drive means operable to rotate said screw member, lost motion means interposed operatively between said drive means and screw member, and lock-releasing means operable by initial rotation of said drive means to shift said nut-carried locking member axially away from the screw-carried locking member engaged therewith to enable relative movement of said screw and nut members in such opposite direction.

8. A strut comprising a pair of telescoping members, cooperating antifriction screw and nut units carried respectively by said telescoping members and received therewithin, drive means operable to effect relative rotation of said screw and nut units in either direction to extend and contract the strut, and means controlled by one of said screw and nut units, operatively connected to said drive means, and operable by rotation of said one of said screw and nut units at a speed in excess of a predetermined speed to render said drive means inoperative to effect relative rotation of said screw and nut units.

9. A strut comprising a pair of telescoping members, cooperating antifriction screw and nut units carried respectively by said telescoping members and received therewithin, drive means operable to effect relative rotation of said screw and nut units in either direction to extend and contract the strut, means controlled by one of said screw and nut units, operatively connected to said drive means, and operable by rotation of said one of said screw and nut units at a speed in excess of a predetermined speed to render said drive means inoperative to effect relative rotation of said screw and nut units, and means operable to exert a substantial braking force on said screw and nut units upon rotation of said one of said screw and nut units at a speed higher than such predetermined speed.

10. A strut comprising a pair of telescoping members, an antifriction assembly including cooperating screw and nut members carried respectively by said telescoping members and received therewithin, drive means operable to rotate said screw and nut members relatively to effect relative axial movement of said screw and nut members in either direction to extend and contract the strut, locking means operable at the end of relative movement of said screw and nut members in one direction to prevent subsequent relative movement of said members in the opposite direction, lost motion means interposed between said drive means and said cooperating screw and nut members and operable in each of two angularly separated driving positions to transmit driving force from said drive means to said screw and nut members, means operable to retain said lost motion means in such respective driving positions, and lock-releasing means independent of said lost motion means, interengaged between said drive means and said locking means, and operable to release said locking means during movement of said lost motion means between such two driving positions.

11. The strut as defined in claim 3 in which the non-rotative unit locking means support includes spring means interconnecting such means and unit to resist relative axial movement of such unit and means.

12. The strut as defined in claim 4 in which the non-rotative unit locking means support includes spring means interconnecting such means and unit to resist relative axial movement of such unit and means, in either direction.

13. The strut as defined in claim 5 in which the lost motion means comprises cam means including a cam member interposed between the drive means and the rotative member and operatively connected to one of such drive means and rotative member, a coacting cam follower operatively connected to the other of such means and member, engaging the cam surface, said cam surface comprising alternate ridges and valleys spaced apart rotatively, from valley to valley, a distance substantially equal to the lost motion of the drive means, and spring means urging said cam member and cam follower together to impose yieldable restraint upon separation of the drive means and rotative member by reverse rotation of one thereof following consumption of the lost motion rotation between said drive means and said rotative member, in either direction, relatively.

14. Control mechanism for a strut formed of cooperating screw and nut units and strut drive means operable to effect relative rotation thereof in either direction, said control mechanism comprising locking means carried by one of said units, cooperating locking means carried by the other of said units, means connecting said locking means antirotationally to their respective units and in such relative positions thereon that said locking means are moved into mutual registry axially of the strut by predetermined relative movement of the screw and nut units in one direction, said two locking means being disposed relatively for mutual interfering engagement effected by attempted relative rotation of said screw and nut units in the reverse direction thereof during axial registry of said two locking means, thereby restraining said screw and nut units against such reverse relative rotation until deregistry of said locking means, means guiding at least one of said locking means for deregistering movement axially of said screw and nut units, to enable reverse relative rotation of the screw and nut units, and deregistering means operable so to move said guided locking means.

15. The control mechanism defined in claim 14 wherein the deregistering means is operable by the strut drive means during initial rotation thereof in the reverse direction from a position corresponding to registry of the locking means, and means operable to delay relative rotation of the screw and nut units by the drive means until deregistry of the locking means is effected thereby.

16. In a variable length strut formed of cooperating antifriction screw and nut units, drive means operable to effect rotation of one of said units relative to the other, locking means carried by each of said screw and nut units and disposed thereon to be movable into mutual axial registry by relative movement of said units in one direction, said locking means being fixed against rotation relative to the respective units carrying such means, and including coacting stop elements disposed, upon registry of said locking means, to mutually interfere upon attempted relative rotation of said screw and nut units in the reverse direction, a lost motion drive connection interposed operatively between said drive means and the unit driven thereby, and means operable by said drive means upon predetermined initial lost motion rotation thereof in said reverse direction to move one of said locking means, and means guiding said locking means for such movement, out of registry with the other, thereby to enable reverse relative rotation of said screw and nut units by continued rotation of said drive means in said reverse direction.

17. A strut comprising screw and nut members, means supporting one of said members for rotation, means supporting the other of said members non-rotatively for axial movement relative to said rotative member by rotation thereof, a locking member carried by said non-rotative member, also non-rotative, and having locking jaws at one end thereof, a locking member carried by said rotative member, rotatable therewith, and having locking jaws complemental to the locking jaws of said first locking member, means guiding one of said locking members for limited relative axial movement on the member which carries it, means yieldably urging said locking member into its limit axial relative position, toward the other locking member, the jaws of said two locking members being formed on one side thereof to rotate past one another one or more times commencing with and after initial axial overlap thereof, until in predetermined axial registry, upon relative axial and rotative movement of said screw and nut members in one direction, and being formed on the other side thereof and operable, while in such registry, to mutually interfere against attempted reverse relative rotation of said screw and nut members in the opposite direction caused by axial load on the strut, lost motion means, drive means connected through said lost motion means to said rotative member and operable to rotate the same in either direction, and lock-releasing means interconnecting said guided locking member and said drive means to move said guided locking member axially out of registry with the other locking member by initial lost motion rotation of said drive means in said reverse direction relatively, thereby to enable reverse relative movement of said screw and nut members in such reverse direction by continued reverse rotation of said drive means.

18. A strut comprising mutually telescoping members, cooperating antifriction screw and nut units carried respectively by and received within said telescoping members for extension and contraction of the strut by relative rotation of said screw and nut units in one direction or the other, axially spaced stop means carried by said screw unit, cooperating stop means carried by and engageable with said screw unit stop means to stop travel of said nut unit relative to said screw unit, whereby said screw unit stop means respectively define the opposite limits of travel of said nut unit relative to said screw unit, locking means carried by said screw unit at axially spaced locations thereon corresponding to the spacing of said screw unit stop means, cooperating locking means carried by said nut unit and disposed thereon for axial registry with one or the other of said screw unit locking means coincidentally with engagement between the respective cooperating stop means during predetermined relative movement between screw and nut units in one direction or the other, said locking means including coacting elements operable, by registry of said locking means, to mutually interfere upon, hence restrain, relative reverse rotation of said screw and nut unit in a direction to disengage the cooperating stop means then interengaged, drive means operable to rotate one of said screw unit and nut unit relative to the other, lost motion means interposed operatively between said drive means and said driven unit, and means controlled by initial lost motion rotation of said drive means to deregister and thereby release the locking means to enable relative rotation of said screw and nut units thereafter in such reverse direction.

19. A strut comprising cooperating antifriction screw and nut units, lost motion means, drive means operable through said lost motion means to effect relative rotation of said units for producing relative axial movement thereof, cooperating locking means carried by said screw and nut units, respectively, and movable relatively axially into locking engagement by relative axial and rotative movement of said screw and nut units in one direction, to hold the screw and nut units against relative axial and rotative movement in the opposite direction when subjected to axial strut loads, means guiding the locking means carried by one of said units for axial movement relative thereto out of engagement with the other locking means, lock-releasing means cooperating with said guided locking means and operable when actuated to move the same axially out of locking engagement with the other locking means, and means controlled by said drive means and operable to actuate said lock-releasing means, during operation of said lost motion means, by movement of said drive means in a direction corresponding to relative axial movement of said screw and nut units in such opposite direction.

20. A strut comprising an antifriction assembly including cooperating screw and nut members, drive means operable to rotate said screw and nut members relatively to effect relative axial movement of said members, a lost motion drive connection interposed operatively between said drive means and the members rotated relatively thereby to require predetermined initial lost motion rotation of said drive means prior to effecting relative rotation of said members, locking means operable by relative axial movement of said members in one direction to hold said members against relative axial movement in the opposite direction caused by axial strut loads, said locking means including cooperating locking elements supported on and movable axially with the screw and nut members, respectively, but each locking element being restrained from rotation relative to its supporting member, one of said locking elements being a controlled element movable axially relative to its supporting member in a direction to disengage from the other of said elements, means resiliently opposing such disengaging axial movement of said controlled element, and lock-releasing means operated by said drive means and operable to shift said controlled locking element axially in positive manner, against the force of said resilient means, out of locking engagement with the other locking element and thereby to release said locking means during initial lost motion rotation of said drive connection, to enable relative rotation and corresponding axial movement of the screw and nut members in said opposite direction during continued rotation of said drive means in the same direction.

21. A strut comprising cooperating antifriction screw and nut units, drive means operable to effect relative rotation of said screw and nut units, locking means operable by relative movement of said screw and nut units in one direction to hold the screw and nut units against relative movement in the opposite direction caused by axial strut load, means operable to effect release of said locking means, enabling said drive means to effect relative movement of said screw and nut units in such opposite direction, speed governor means responsive to relative rotational speed of said screw and nut units, and means operated by said governor means, operatively connected to said drive means, and operable automatically to render said drive means inoperative to effect relative rotation of said screw and nut units when their relative rotational speed exceeds a predetermined value.

22. A strut comprising cooperating antifriction screw and nut members, drive means operable to rotate said screw and nut members relatively to effect relative axial movement of said members, locking means operable to hold said screw and nut members against relative rotative and axial movement, including two locking elements carried one by each of said members for movement rotatively and axially with such respective members and interengageable to prevent relative rotative and axial movement of said members, means movably supporting one of said locking elements for shifting axially relative to the member carrying it to withdraw such element from locking engagement with the other element, releasing means operable to effect axial shifting of said movably supported locking element relative to the member carrying it prior to initiation of relative rotation of said screw and nut members by said drive means, for releasing said locking means, and means driven by said drive means and operable to effect such releasing movement of said releasing means.

WALLACE E. SKIDMORE.
ROBERT P. PERSON.
FRANK TERDINA.

REFERENCES CITED

The following references are of record in the file of this patent:

UNITED STATES PATENTS

| Number | Name | Date |
|---|---|---|
| 753,135 | Hanford | Feb. 23, 1904 |
| 857,549 | Dillon | June 18, 1907 |
| 2,283,476 | Waibel | May 19, 1942 |
| 2,401,256 | Lear | May 28, 1946 |
| 2,410,695 | Werner | Nov. 5, 1946 |
| 2,422,905 | Jackson | June 24, 1947 |